United States Patent
Miller et al.

(10) Patent No.: US 9,300,807 B2
(45) Date of Patent: Mar. 29, 2016

(54) USING PERSONALIZED TONES TO INDICATE WHEN A PARTICIPANT ARRIVES AND/OR LEAVES A CONFERENCE CALL

(75) Inventors: Steven Michael Miller, Cary, NC (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 2527 days.

(21) Appl. No.: 12/039,222

(22) Filed: Feb. 28, 2008

(65) Prior Publication Data
US 2009/0220063 A1    Sep. 3, 2009

(51) Int. Cl.
*H04M 3/56* (2006.01)
*H04M 19/04* (2006.01)
*H04M 3/42* (2006.01)

(52) U.S. Cl.
CPC .............. *H04M 3/56* (2013.01); *H04M 19/041* (2013.01); *H04M 3/42153* (2013.01); *H04M 2203/5081* (2013.01)

(58) Field of Classification Search
CPC . H04M 3/56; H04M 19/041; H04M 3/42153; H04M 2203/5081
USPC ............. 379/201.01, 201.02, 202.01, 204.01, 379/93.21
See application file for complete search history.

(56) References Cited

U.S. PATENT DOCUMENTS

| | | | |
|---|---|---|---|
| 5,483,588 A * | 1/1996 | Eaton et al. | 379/202.01 |
| 6,304,648 B1 | 10/2001 | Chang | 379/202.01 |
| 7,130,404 B2 | 10/2006 | Coles et al. | 379/202.01 |
| 7,266,189 B1 | 9/2007 | Day | 379/202.01 |
| 7,617,280 B1 * | 11/2009 | Webster et al. | 709/204 |
| 2005/0149876 A1 | 7/2005 | Kortum et al. | |
| 2008/0222536 A1 | 9/2008 | Berstis et al. | |
| 2008/0240392 A1 | 10/2008 | Berstis et al. | |
| 2009/0220063 A1 | 9/2009 | Miller et al. | |
| 2009/0319920 A1 | 12/2009 | Kortum et al. | |

* cited by examiner

*Primary Examiner* — Antim Shah
(74) *Attorney, Agent, or Firm* — Robert A. Voigt, Jr.; Winstead, P.C.

(57) ABSTRACT

A method, system and computer program product for identifying which participant joined or exited a conference call. A participant to a conference call is able to select a personalized tone from a list of predetermined tones or to upload a personalized tone to a designated site, where the personalized tone is to be played upon the participant joining and/or exiting the conferencing call. In this manner, the other participants of the conference call would know which participant joined or exited the conference call.

18 Claims, 7 Drawing Sheets

USING PERSONALIZED TONES TO INDICATE WHEN A PARTICIPANT ARRIVES AND/OR LEAVES A CONFERENCE CALL

TECHNICAL FIELD

The present invention relates to teleconference systems, and more particularly to using personalized tones to indicate when a participant arrives and/or leaves a conference call.

BACKGROUND OF THE INVENTION

Teleconference systems, or simply "conference call systems," bring multiple parties together from remote locations. Ideally, teleconference systems allow participants to communicate with each other as if they were seated in the same room. A teleconference system includes at least two stations (e.g., mobile telephone, landline telephone) set up in remote rooms or locations interconnected by a transmission system, such as a global network or a telephone system.

Participants at each of the stations communicate with each other through audio equipment. Audio equipment for each station typically includes one or more microphones, speakers, and the like.

Currently, when a participant joins or exits the conference call, a sound, such as a door bell, is played to indicate that the participant either joined or exited the conference call. However, the other participants, including the moderator of the conference call, do not know which participant joined or exited the conference call. That is, when a participant joins or exits the conference call, the other participants do not know who joined or exited the conference call. If a personalized indication could be played to signify joining and/or exiting the conference call for a particular participant, then the other participants would know which participant joined or exited the conference call.

BRIEF SUMMARY OF THE INVENTION

In one embodiment of the present invention, a method for identifying which participant joined or exited a conference call comprises receiving a request from a requester to select a tone for joining and/or exiting a conference call for an identified participant. The method further comprises receiving a selection of a tone from a list of tones to be associated with the identified participant for joining and/or exiting the conference call. Further, the method comprises saving the selected tone from the list of tones associated with the identified participant for joining and/or exiting the conference call.

In another embodiment of the present invention, a method for identifying which participant joined or exited a conference call comprises receiving a request from a requester to access a conference call service. The method further comprises generating speech signals prompting the requester to indicate if the requester is to upload a tone for joining and/or exiting a conference call. Additionally, the method comprises generating speech signals prompting the requester to upload the tone at a designated site for joining and/or exiting the conference call if the requester indicated to upload the tone for joining and/or exiting the conference call, where the tone is associated with the requester.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWING

A better understanding of the present invention can be obtained when the following detailed description is considered in conjunction with the following drawings, in which.

DETAILED DESCRIPTION OF THE INVENTION

The present invention comprises a method, system and computer program product for identifying which participant joined or exited a conference call. In one embodiment of the present invention, a participant to a conference call is able to select a personalized tone from a list of predetermined tones or to upload a personalized tone to a designated site, where the personalized tone is to be played upon the participant joining and/or exiting the conferencing call. In this manner, the other participants of the conference call would know which participant joined or exited the conference call.

While the following discusses the present invention in connection with implementing a conference bridge, the principles of the present invention may be implemented in connection with live streaming or broadcasting over a computer network without the requirement of a conference bridge. A person of ordinary skill in the art would be capable of applying the principles of the present invention to such implementations. Further, embodiments applying the principles of the present invention to such implementations would fall within the scope of the present invention.

Further, when the following discusses selecting a "tone" or uploading a "tone," the term "tone" is not to be limited in scope to a sound of a definite pitch and vibration but to include any sound of any duration of time, including, but not limited to, music, speech, voice, instrumental, etc.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
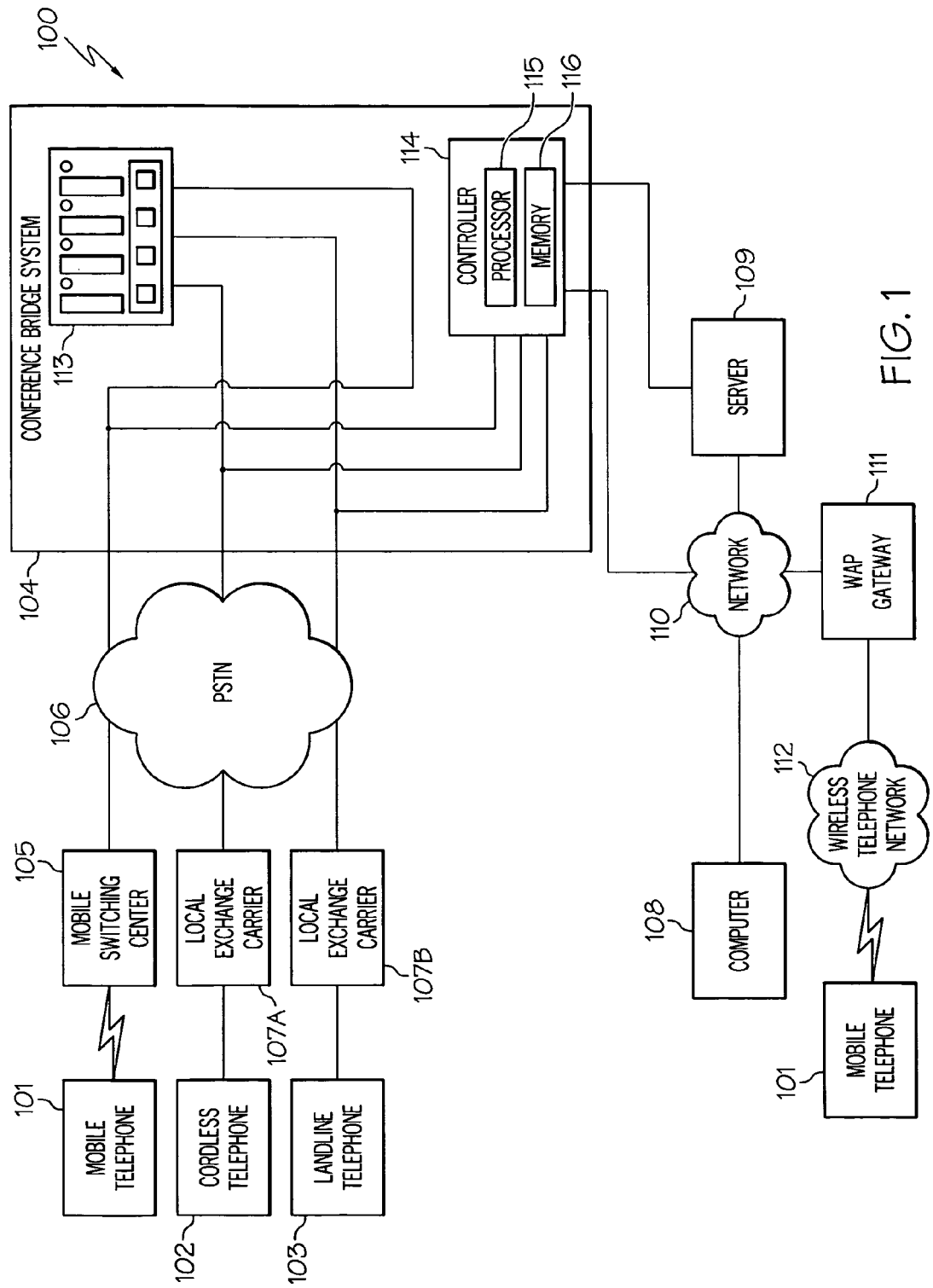
FIG. 1 illustrates a teleconference system in accordance with an embodiment of the present invention.

FIG. 1—Teleconference System

FIG. 1 illustrates an embodiment of the present invention of a teleconference system 100. Teleconference system 100 may include one or more mobile telephones 101, one or more cordless telephones 102 and one or more landline telephones 103.

Mobile telephone 101 may be connected to a conference bridge system 104 via a mobile telephone switching center 105 and a Public Switched Telephone Network (PSTN) 106. Mobile telephone switching center 105 connects the landline Public Switched Telephone Network (PSTN) 106 to the mobile phone system. PSTN 106 may be connected to conference bridge system 104.

Similarly, cordless telephone 102 may be connected to a conference bridge system 104 via a local exchange carrier 107A and PSTN 106. Local exchange carrier 107A enables cordless telephone 102 to gain access to conference bridge system 104 via PSTN 106. Further, landline telephone 103 may be connected to a conference bridge system 104 via a local exchange carrier 107B and PSTN 106. Local exchange carrier 107B enables landline telephone 103 to gain access to conference bridge system 104 via PSTN 106. Local exchange carriers 107A-B may collectively or individually be referred to as local exchange carriers 107 or local exchange carrier 107, respectively.

Teleconference system 100 may further include a data processing system 108, which runs suitable web browser software, connected to a server 109 via a computer network 110 (e.g., Local Area Network (LAN), such as Ethernet, Token Ring, ARCnet, or a Wide Area Network (WAN), such as the Internet). Data processing system 108 may be any type of device configured with the capability of connecting to network 110 and consequently communicating with server 109. Server 109 may be configured to store tones selected or uploaded from participants of the conference call as discussed further below.

Teleconference system 100 may further include a mobile device, which runs suitable web browser software, such as mobile telephone 101 or a personal digital assistant, which is connected to a Wireless Application Protocol (WAP) gateway 111 via a wireless telephone network 112. WAP gateway 111 provides a set of communication protocols enabling wireless devices, such as mobile telephone 101, to access computer network 110.

As stated above, teleconference system 100 may include a conference bridge system 104. Conference bridge system 104 may include a conference bridge 113 configured to connect callers of mobile telephones 101, cordless telephones 102 and landline telephones 103 together, such as on a conference call. Further, conference bridge 113 may be configured to monitor the conference call session as well as electronically balance the lines so that each caller can hear and speak to all the other callers no matter how many people hop on or off the call.

Teleconference system 100 may include any number of mobile telephones 101, cordless telephones 102 and landline telephones 103. Further, teleconference system 100 may include any number of mobile devices (e.g., personal digital assistant, mobile telephone 101) with the capability of connecting to computer network 110. Additionally, teleconference system 100 may include any number of data processing systems 108.

Furthermore, conference bridge system 104 may include a controller 114 coupled to conference bridge 113. Controller 114 is further connected to sever 109 and directly and indirectly to computer network 110. Controller 114 is configured to identify which participant joined or exited the conference call as discussed herein. Controller 114 may include a processor 115 coupled to a memory 116. Processor 115 may be configured to execute the instructions of the program stored in memory 116. In one embodiment, the program for identifying which participant joined or exited the conference call, as discussed further below in connection with FIGS. 2A-C, 3 and 4A-B, may reside in memory 116. Further, memory 116 may include a program for voice recording (discussed further below).

FIG. 1 is illustrative of an embodiment of teleconference system 100 and FIG. 1 is not to be limited in scope to any one particular embodiment. For example, other mobile devices, such as a personal digital assistant, may also be used by a caller to connect with a conference call session.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

As discussed in the Background section, currently, when a participant joins or exits the conference call, a sound, such as a door bell, is played to indicate the participant either joining or exiting the conference call. However, the other participants, including the moderator of the conference call, do not know which participant joined or exited the conference call. That is, when a participant joins or exits the conference call, the other participants do not know who joined or exited the conference call. If a personalized indication could be played to signify joining and/or exiting the conference call for a particular participant, then the other participants would know which participant joined or exited the conference call.

Figure 2A:
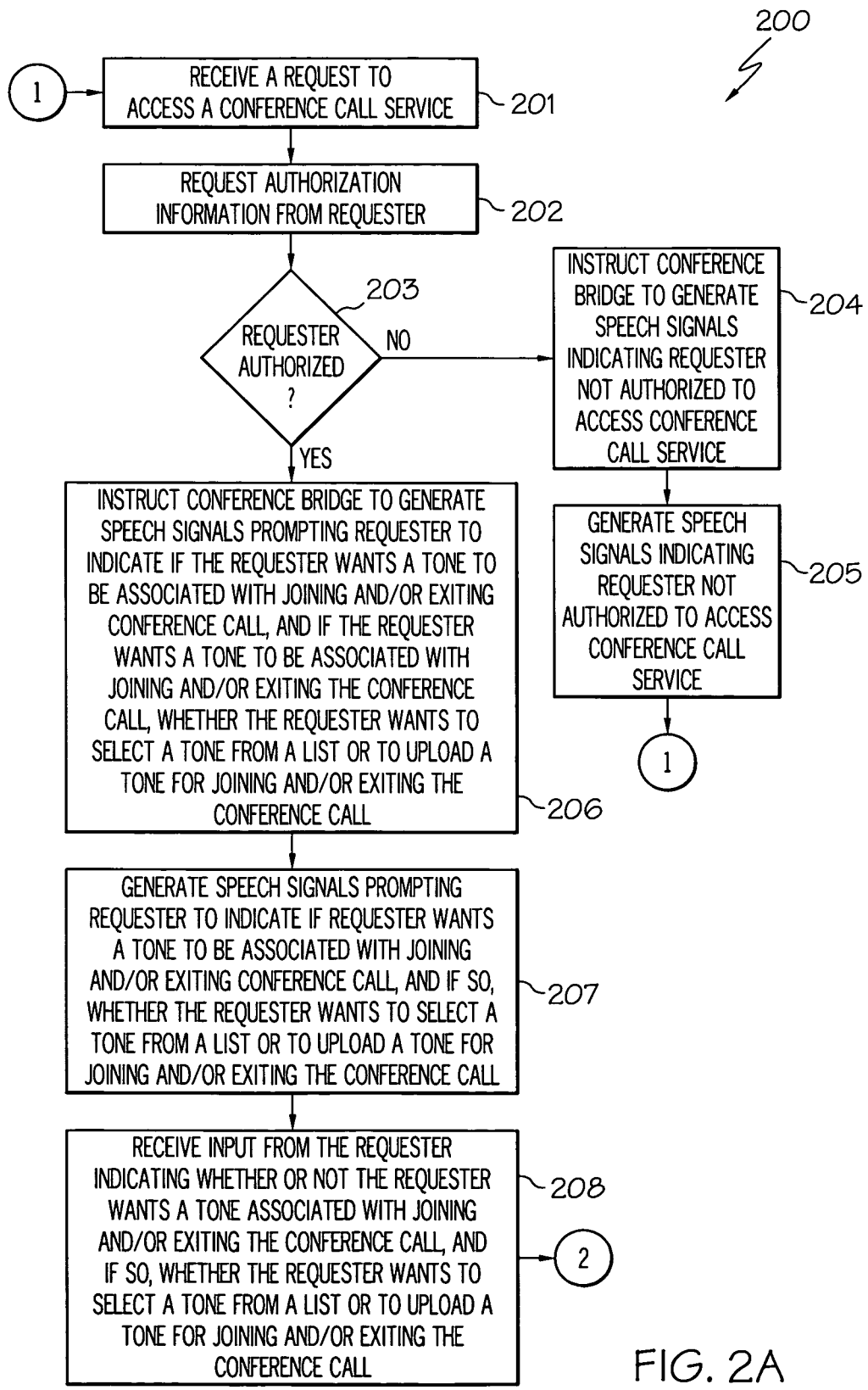
FIGS. 2A-C are a flowchart of a method for selecting or uploading personalized tones by participants of the conference call in accordance with an embodiment of the present invention.
Figure 2B:
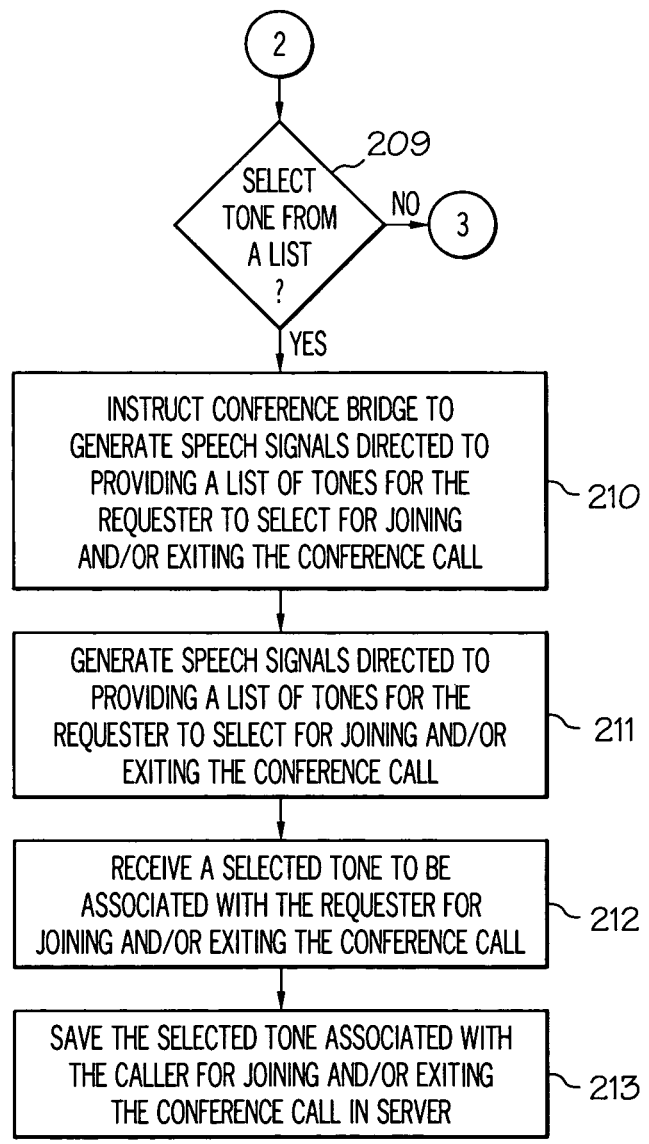
Figure 2C:
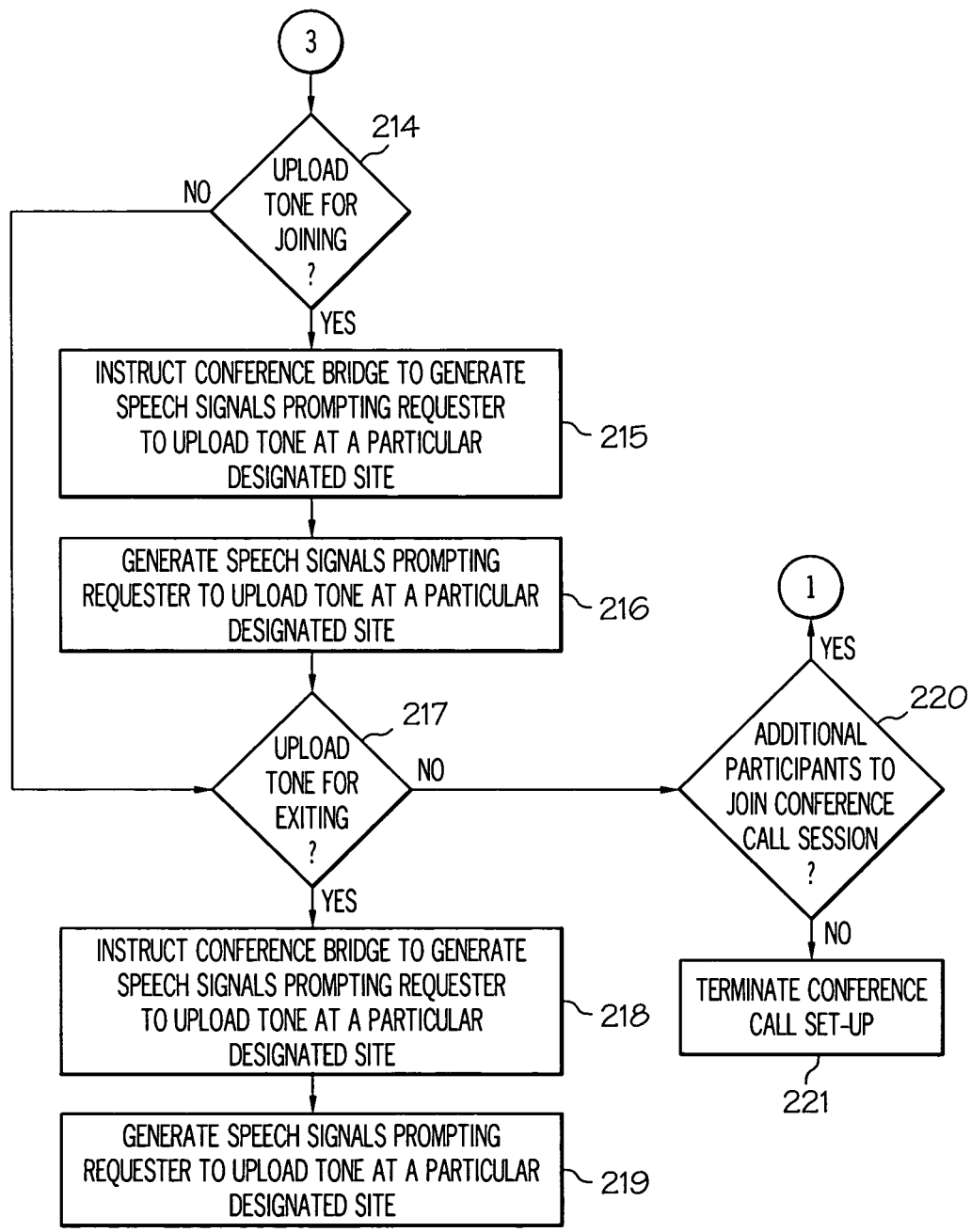
Figure 3:
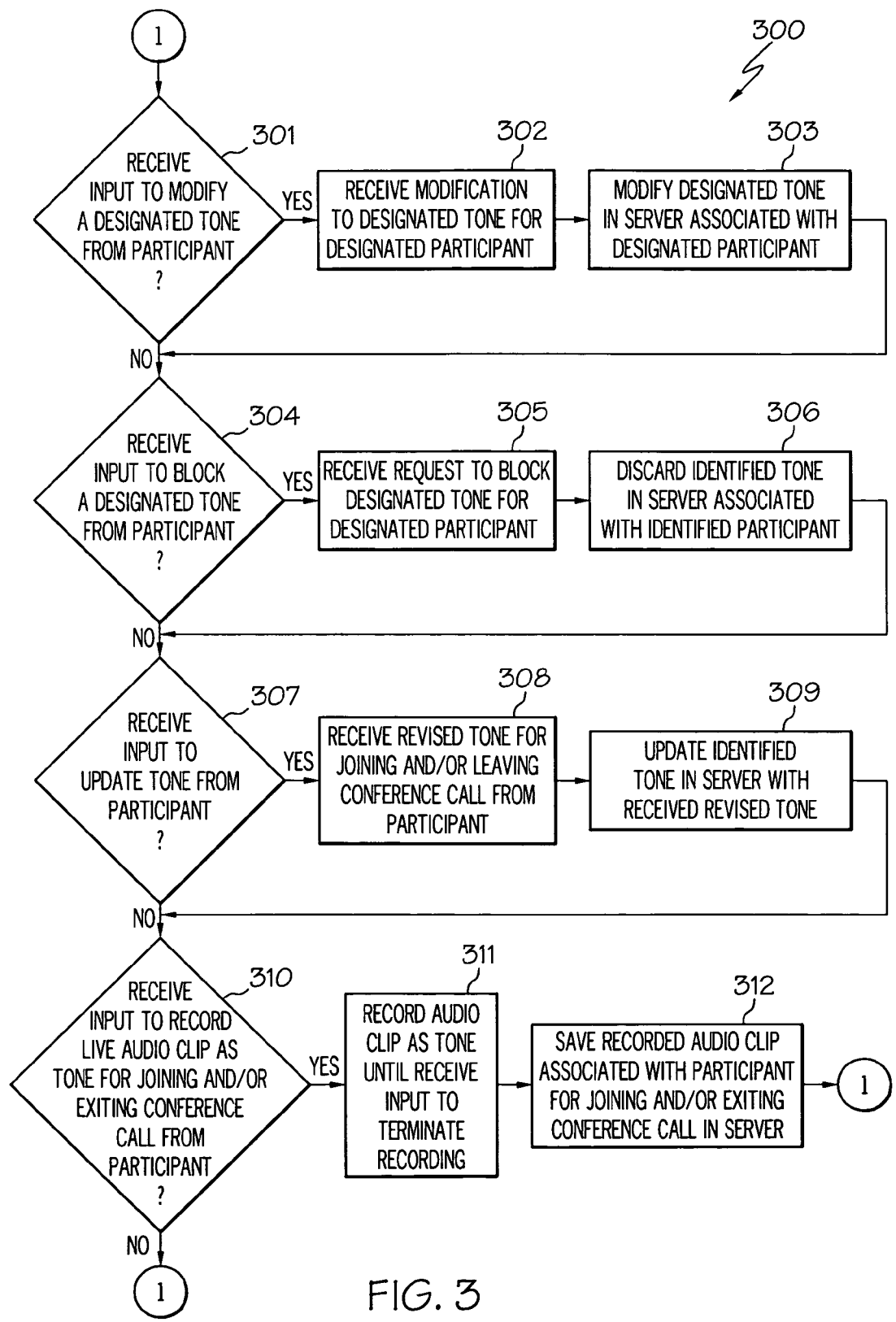
FIG. 3 is a flowchart of a method for updating the selected or uploaded personalized tones in accordance with an embodiment of the present invention.
Figure 4A:
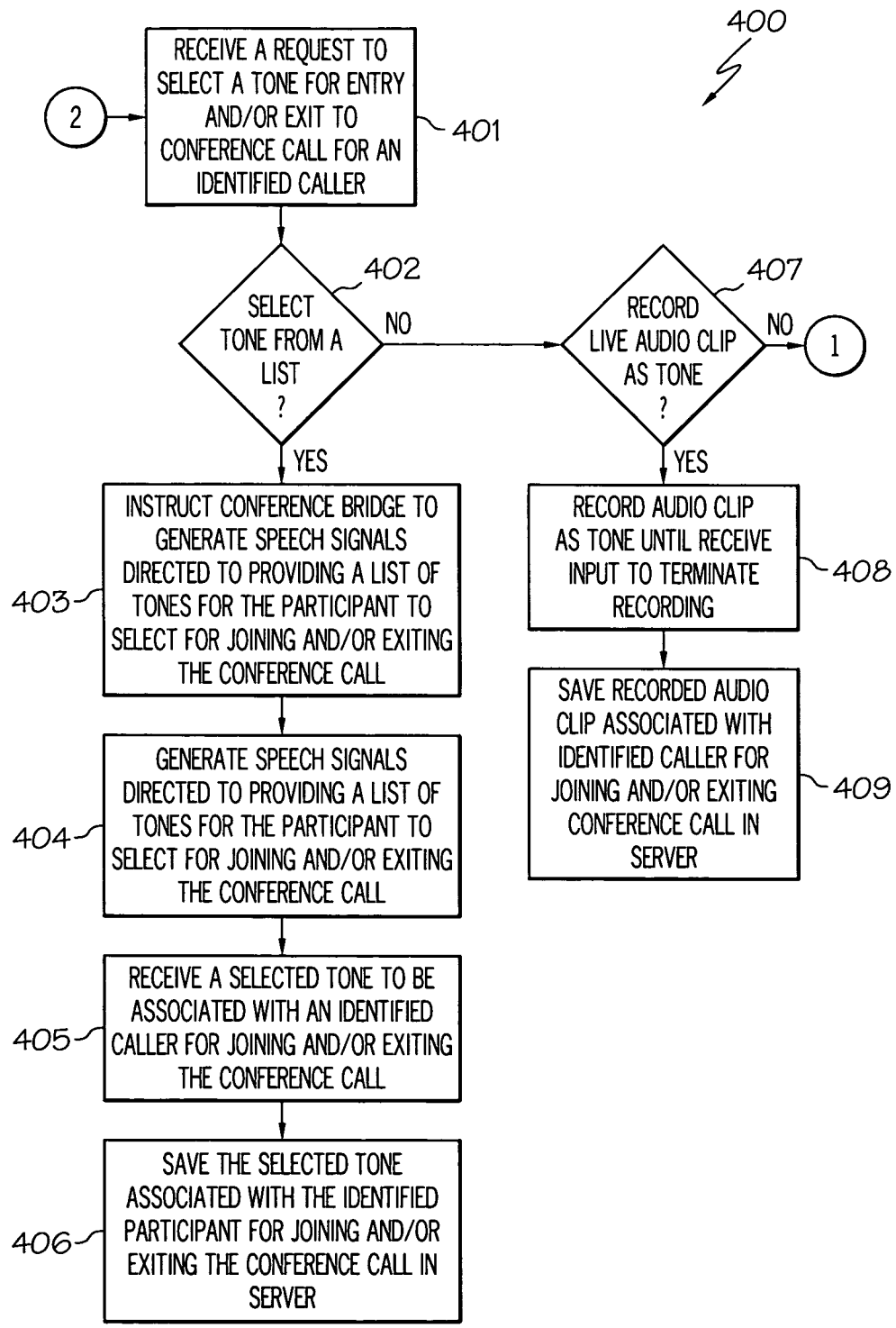
FIGS. 4A-B are a flowchart of a method for having a participant, such as the moderator, select personalized tones for the participants of the conference call in accordance with an embodiment of the present invention.
Figure 4B:
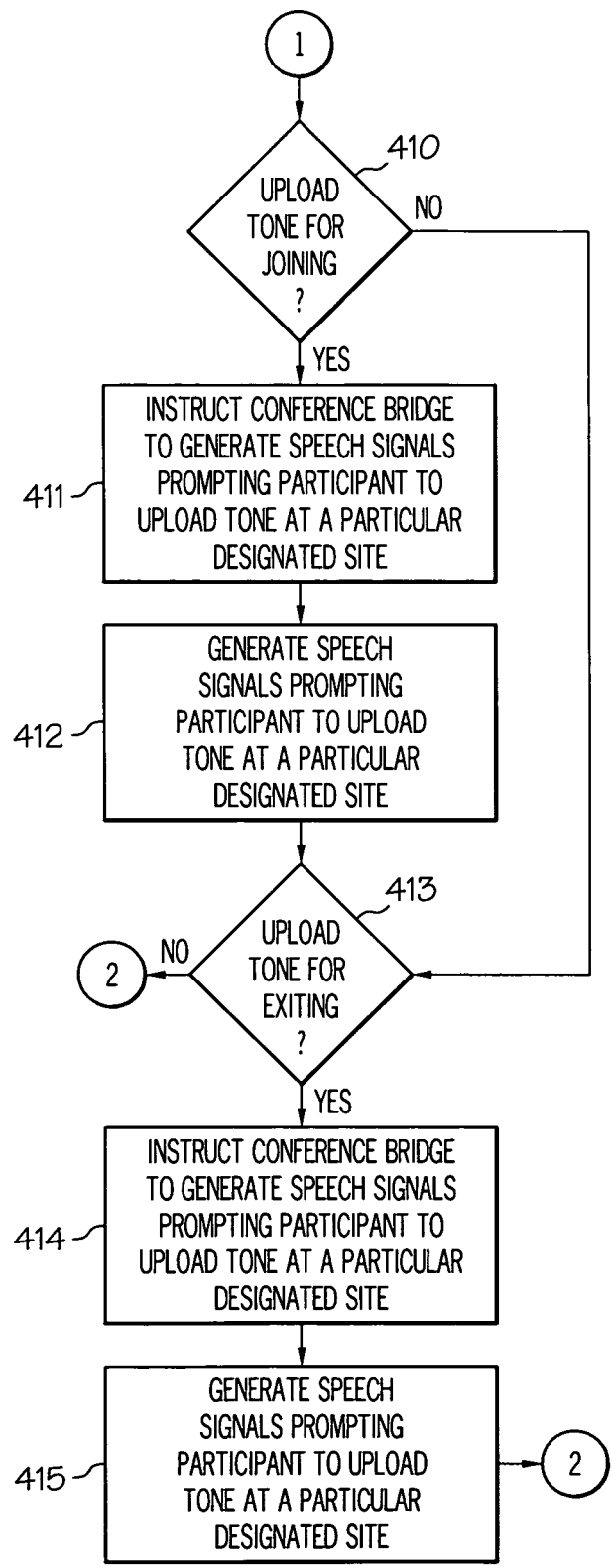

As described below in connection with FIGS. 2A-C, 3 and 4A-B, participants may be able to select or upload personalized tones that will play when they arrive and/or leave the conference call. In this manner, the other participants (e.g., moderator) will know which participant joined or exited the conference call. FIGS. 2A-C are a flowchart of a method for selecting or uploading personalized tones by participants of the conference call. FIG. 3 is a flowchart of a method for updating the personalized tones. FIGS. 4A-B are a flowchart of a method for the participant, such as the moderator, to select personalized tones for the participants of the conference call.

FIGS. 2A-C—Method for Selecting or Uploading Personalized Tones

FIGS. 2A-C are a flowchart of a method 200 for selecting or uploading personalized tones by participants of the conference call in accordance with an embodiment of the present invention.

Referring to FIG. 2A, in conjunction with FIG. 1, in step 201, controller 114 receives a request from a participant (e.g., user of mobile telephone 101) to access a conference call service. For example, the participant may dial a particular "800" number to gain access to the conference call service.

In step 202, controller 114 requests authorization information from the requestor. For example, controller 114 may request a pass code to be entered by the participant on the telephone keypad in order to obtain access to the conference call service. The pass code may have been previously provided to those participants that are authorized to join the conference call by the moderator of the conference call.

In step 203, controller 114 determines whether the requester is authorized. In one embodiment, the requester is deemed to be authorized by controller 114 if controller 114 receives the authorization information from the requestor. If controller 114 does not receive the appropriate authorization information, then controller 114 may prevent the caller from joining the conference call session.

If the requester is not authorized to join the conference call, then, in step 204, controller 114 instructs conference bridge 113 to generate speech signals indicating the requester is not authorized to access the conference call service. In step 205, conference bridge 113 generates speech signals indicating the requester is not authorized to access the conference call service. Upon conference bridge 113 generating speech signals indicating the requester is not authorized to access the conference call service, controller 114 continues to wait to receive a request from another participant to access the conference call service in step 201.

If, however, the requester is authorized to join the conference call, then, in step 206, controller 114 instructs conference bridge 113 to generate speech signals prompting the requester to indicate if the requester wants a tone to be associated with joining and/or exiting the conference call, and if the requester wants a tone to be associated with joining and/or exiting the conference call, whether the requester wants to select a tone from a list or to upload a tone for joining and/or exiting the conference call. In step 207, conference bridge 113 generates speech signals prompting the requester to indicate if the requester wants a tone to be associated with joining and/or exiting the conference call, and if the requester wants a tone to be associated with joining and/or exiting the conference call, whether the requester wants to select a tone from a list or to upload a tone for joining and/or exiting the conference call.

In step 208, controller 114 receives input from the requester indicating whether or not the requester wants a tone associated with joining and/or exiting the conference call. Further, controller 114 receives input as to whether the requester is to select a tone from a list or to upload a tone for joining and/or exiting the conference call if the requester indicated that he/she wants a tone associated with joining and/or exiting the conference call. For example, the caller may input an indication that he/she wants a tone associated with joining and/or exiting the conference call by selecting various numbers/letters/symbols on an alphanumeric telephone keypad. Further, the caller may input an indication that he/she wants to select a tone from a list or to upload a tone for joining and/or exiting the conference call by selecting various numbers/letters/symbols on an alphanumeric telephone keypad.

Referring to FIG. 2B, in conjunction with FIG. 1, in step 209, controller 114 determines whether the requester wants to select a tone from a list.

If controller 114 received an indication from the requester indicating that the requester wanted to select a tone from a list, then, in step 210, controller 114 instructs conference bridge 113 to generate speech signals directed to providing a list of tones for the requester to select for joining and/or exiting the conference call. In step 211, conference bridge 113 generates speech signals directed to providing a list of tones for the requester to select for joining and/or exiting the conference call.

In step 212, controller 114 receives a selected tone to be associated with the requester for joining and/or exiting the conference call. For example, the caller may select a particular tone from the list provided to the caller for joining and/or exiting the conference call by selecting various numbers/letters/symbols on an alphanumeric telephone keypad.

In step 213, controller 114 saves the selected tone associated with the caller for joining and/or exiting the conference call in server 109.

Referring to FIG. 2C, in conjunction with FIG. 1, if, however, controller 114 did not receive an input from the requester indicating that the requester wanted to select a tone from a list, then, in step 214, controller 114 determines whether the requester is to upload a tone for joining the conference call.

If controller 114 receives an indication from the caller requesting to upload a tone for joining the conference call, then, in step 215, controller 114 instructs conference bridge 113 to generate speech signals prompting the requester to upload the tone at a designated site (e.g., website location). In step 216, conference bridge 113 generates speech signals prompting the requester to upload the tone at a designated site. For example, the caller may receive a prompt to upload the tone at a particular website. If the caller's telecommunication device (e.g., mobile telephone 101) has web browsing software, then the caller may upload the tone to server 109 via computer network 111, which the caller accesses through WAP gateway 111 and wireless network 112. Alternatively, if the caller's telecommunication device (e.g., landline telephone 103) does not have web browsing software, then the caller may upload the tone to server 109 via computer network 111 using computer 108 (e.g., in a workplace environment, the caller may use the telephone to access the conference call and the computer to upload the tone).

If the caller did not request to upload a tone for joining the conference call, or, upon conference bridge 113 generating speech signals prompting the requester to upload the tone at a designated site, controller 114 determines whether the requester is to upload a tone for exiting the conference call in step 217.

If the caller requests to upload a tone for exiting the conference call, then, in step 218, controller 114 instructs conference bridge 113 to generate speech signals prompting the requester to upload the tone at a designated site. In step 219, conference bridge 113 generates speech signals prompting the requester to upload the tone at a designated site.

If the caller did not request to upload a tone for exiting the conference call, or, upon conference bridge 113 generating speech signals prompting the requester to upload the tone at a designated site, controller 114, in step 220, determines whether there are additional participants to join the conference call session.

If there are additional participants to join the conference call session, then controller 114 waits to receive another request to access the conference call session from another participant in step 201.

If, however, all the participants have joined the conference call session, then, in step 221, controller 114 terminates the conference call set-up.

Method 200 may include other and/or additional steps that, for clarity, are not depicted. Further, method 200 may be executed in a different order presented and that the order presented in the discussion of FIGS. 2A-C is illustrative. Additionally, certain steps in method 200 may be executed in a substantially simultaneous manner or may be omitted.

A discussion of updating the selected or uploaded personalized tones is provided below in connection with FIG. 3.

FIG. 3—Method for Updating the Selected Uploaded Personalized Tones

FIG. 3 is a flowchart of a method 300 for updating the selected or uploaded personalized tones in accordance with an embodiment of the present invention.

Referring to FIG. 3, in conjunction with FIG. 1, in step 301, controller 114 determines if it received input from a participant (e.g., moderator) to modify a designated tone. For example, controller 114 may receive an indication from the moderator, such as via the selection of particular numbers/letters/symbols on the alphanumeric telephone keypad, to provide a modification to a selected or uploaded tone. In one embodiment, the participant may indicate which tone for which participant in response to prompts provided by controller 114 via conference bridge 113. For example, the moderator, in response to a prompt, may indicate which participant whose tone is to be modified via the selection of particular numbers/letters/symbols on the alphanumeric telephone keypad. The prompt may include a menu or a listing of participants to the conference call along with a number associated with the participant. The moderator may then select the number for the participant whose tone is to be modified. Further, conference bridge 113 may generate the tone(s) uploaded for the selected participant. The moderator may then select an alphanumeric character on the telephone keypad corresponding to the tone to be modified.

If controller 114 received input from a participant (e.g., moderator) to modify a designated tone, then, in step 302, controller 114 receives the modification to the designated tone for the designated participant. For example, the moderator may indicate, such as via selecting alphanumeric characters on the telephone keypad, to limit the length of the duration of the tone. In step 303, controller 114 modifies the designated tone for the designated participant in accordance with the input received in step 302. For example, controller 114 may modify the designated tone stored in server 109 for the designated participant in accordance with the moderator's request.

If no input is received to modify a designated tone or after modifying the designated tone in server 109 associated with the identified participant, then controller 114, in step 304, determines if it received input from a participant (e.g., moderator) to block a designated tone. For example, controller 114 may receive an indication from the moderator, such as via the selection of particular numbers/letters/symbols on the alphanumeric telephone keypad, to block an uploaded tone. In one embodiment, the participant may indicate which tone to block in response to prompts provided by controller 114 via conference bridge 113. For example, the moderator, in response to a prompt, may indicate which participant whose tone is to be blocked via the selection of particular numbers/letters/symbols on the alphanumeric telephone keypad. The prompt may include a menu or a listing of participants to the conference call along with a number associated with the participant. The moderator may then select the number for the participant whose tone is to be blocked. Further, conference bridge 113 may generate the tone(s) associated with the selected participant. The moderator may then select an alphanumeric character on the telephone keypad corresponding to the tone to be blocked.

If controller 114 received input from a participant (e.g., moderator) to block a designated tone, then, in step 305, controller 114 receives the request to block a designated tone for the designated participant. In step 306, controller 114 discards the designated tone in server 109 for the designated participant.

If no input is received to block a designated tone or after blocking the designated tone in server 109 associated with the identified participant, then controller 114, in step 307, determines if it received input from a participant (e.g., moderator) to update a designated tone. For example, controller 114 may receive an indication from the moderator, such as via the selection of particular numbers/letters/symbols on the alphanumeric telephone keypad, to update a selected or uploaded tone. In one embodiment, the participant may indicate which tone for which participant in response to prompts provided by controller 114 via conference bridge 113. For example, the moderator, in response to a prompt, may indicate which participant whose tone is to be updated via the selection of particular numbers/letters/symbols on the alphanumeric telephone keypad. The prompt may include a menu or a listing of participants to the conference call along with a number associated with the participant. The moderator may then select the number for the participant whose tone is to be modified. Further, conference bridge 113 may generate the tone(s) associated with the selected participant for joining and/or exiting the conference call. The moderator may then select an alphanumeric character on the telephone keypad corresponding to the tone to be updated.

If controller 114 received input from a participant (e.g., moderator) to update a designated tone, then, in step 308, controller 114 receives the revised tone for the designated tone for joining and/or exiting the conference call. In one embodiment, the participant (e.g., moderator) transmits an audio file to controller 114 via computer network 110. For example, if the participant's telecommunication device (e.g., mobile telephone 101) has web browsing software, then the caller may transmit the audio file to controller 114 via computer network 110, which the caller accesses through WAP gateway 111 and wireless network 112. Alternatively, if the participant's telecommunication device (e.g., landline telephone 103) does not have web browsing software, then the participant may transmit the revised tone (audio file) to controller 114 via computer network 110 using computer 108 (e.g., in a workplace environment, the caller may use the telephone to access the conference call and the computer to transmit the revised tone).

In step 309, controller 114 updates the identified tone in server 109 with the received revised tone.

If no input is received to update a designated tone or after updating the designated tone in server 109 associated with the identified participant, then controller 114, in step 310, determines if it received input from a participant (e.g., moderator) to record a live audio clip as a tone for that participant for joining and/or exiting the conference call. For example, controller 114 may receive an indication from the moderator, such as via the selection of particular numbers/letters/symbols on the alphanumeric telephone keypad, to record a live audio clip. In one embodiment, the participant may indicate to record a live audio clip for either joining and/or exiting the conference call in response to prompts provided by controller 114 via conference bridge 113. For example, the moderator, in response to a prompt, may indicate, via selecting particularly alphanumeric characters on the telephone keypad, whether controller 114 is to record a live audio clip for joining or for exiting the conference call.

If controller 114 received input from a participant (e.g., moderator) to record a live audio clip as a tone for that participant for joining and/or exiting the conference call, then, in step 311, controller 114 records a live audio clip as a tone. For example, controller 114 may include voice recording software stored in memory 116. Controller 114 may activate and terminate the voice recording software in response to input received from the participant which may include instructions as to when to start and stop recording. For example, the participant may select a particular character on the telephone keypad to start recording and select another character on the telephone keypad to stop recording.

In step 312, controller 114 saves the recorded live audio clip associated with the participant (i.e., the caller) for joining and/or exiting the conference call in server 109.

If no input is received to record a live audio clip as a tone or after saving the recorded live audio clip, then controller 114, in step 301, determines if it received input from a participant (e.g., moderator) to modify a designated tone.

Method 300 may include other and/or additional steps that, for clarity, are not depicted. Further, method 300 may be executed in a different order presented and that the order presented in the discussion of FIG. 3 is illustrative. Additionally, certain steps in method 300 may be executed in a substantially simultaneous manner or may be omitted.

There may be times when a participant, such as a moderator, may not want to allow the other participants of the conference call to have the ability to select their own tones. In such a case, it may be desirable to have the participant, such as the moderator, select personalized tones for the participants of the conference call, as discussed below in connection with FIGS. 4A-B.

FIGS. 4A-B—Method for Participant to Select Personalized Tones for the Participants of the Conference Call FIGS. 4A-B are a flowchart of a method 400 for a participant, such as the moderator, to select personalized tones for the participants of the conference call in accordance with an embodiment of the present invention.

Referring to FIG. 4A, in conjunction with FIG. 1, in step 401, controller 114 receives a request from a participant (e.g., moderator) to select a tone for the joining and/or exiting of a particular caller to a conference call. For example, controller 114 may receive an indication from the moderator, such as via the selection of particular numbers/letters/symbols on the alphanumeric telephone keypad, to select a tone for the joining and/or exiting of a particular caller to a conference call. In one embodiment, the moderator may indicate which participant of the conference call whose tone is to established by the moderator via the selection of particular numbers/letters/symbols on the alphanumeric telephone keypad. In one embodiment, the moderator may indicate whether the moderator wants to select a tone from a list, record a live audio clip as a tone or to upload a tone for joining and/or exiting a conference call for the identified participant via the selection of particular numbers/letters/symbols on the alphanumeric telephone keypad.

In step 402, controller 114 determines whether the participant (e.g., moderator) wants to select a tone from a list.

If the participant (e.g., moderator) wants to select a tone from a list, then, in step 403, controller 114 instructs conference bridge 113 to generate speech signals directed to providing a list of tones for the participant (e.g., moderator) to select for joining and/or exiting the conference call. In step 404, conference bridge 113 generates speech signals directed to providing a list of tones for the participant (e.g., moderator) to select for joining and/or exiting the conference call.

In step 405, controller 114 receives a selected tone to be associated with an identified caller for joining and/or exiting the conference call. For example, the moderator may input an indication of selecting a particular tone from the list provided to the moderator for joining and/or exiting an identified caller to the conference call by selecting various numbers/letters/symbols on an alphanumeric telephone keypad.

In step 406, controller 114 saves the selected tone associated with the identified participant for joining and/or exiting the conference call in server 109.

If, however, the moderator does not want to select a tone from a list, then, in step 407, controller 114 determines if it received input from the participant (e.g., moderator) to record a live audio clip as a tone for the identified caller for joining and/or exiting the conference call. For example, controller 114 may receive an indication from the moderator, such as via the selection of particular numbers/letters/symbols on the alphanumeric telephone keypad, to record a live audio clip.

If controller 114 received input from the participant (e.g., moderator) to record a live audio clip as a tone for the identified caller for joining and/or exiting the conference call, then, in step 408, controller 114 records a live audio clip as a tone. For example, controller 114 may include voice recording software stored in memory 116. Controller 114 may activate and terminate the voice recording software in response to input received from the participant (e.g., moderator) which may include instructions as to when to start and stop recording. For example, the moderator may select a particular character on the telephone keypad to start recording and select another character on the telephone keypad to stop recording.

In step 409, controller 114 saves the recorded live audio clip associated with the identified caller for joining and/or exiting the conference call in server 109.

Referring to FIG. 4B, in conjunction with FIG. 1, if, however, controller 114 did not receive input indicating that the participant (e.g., moderator) wants to record a live audio clip as a tone, then, in step 410, controller 114 determines whether the participant (e.g., moderator) is to upload a tone, associated with the identified caller, for joining the conference call.

If the participant (e.g., moderator) requests to upload a tone, associated with the identified caller, for joining the conference call, then, in step 411, controller 114 instructs conference bridge 113 to generate speech signals prompting the participant (e.g., moderator) to upload the tone at a designated site (e.g., website location). In step 412, conference bridge 113 generates speech signals prompting the participant (e.g., moderator) to upload the tone at a designated site. For example, the moderator may receive a prompt to upload the tone at a particular website. If the moderator's telecommunication device (e.g., mobile telephone 101) has web browsing software, then the moderator may upload the tone to server 109 via computer network 111, which the moderator accesses through WAP gateway 111 and wireless network 112. Alternatively, if the moderator's telecommunication device (e.g., landline telephone 103) does not have web browsing software, then the moderator may upload the tone to server 109 via computer network 111 using computer 108 (e.g., in a workplace environment, the moderator may use the telephone to access the conference call and the computer to upload the tone).

If the participant (e.g., moderator) did not request to upload a tone, associated with the identified participant, for joining the conference call, or, upon conference bridge 113 generating speech signals prompting the participant (e.g., moderator) to upload the tone at a designated site, controller 114 determines whether the participant (e.g., moderator) is to upload a tone, associated with the identified participant, for exiting the conference call in step 413.

If the participant (e.g., moderator) requests to upload a tone, associated with the identified participant, for exiting the conference call, then, in step 414, controller 114 instructs conference bridge 113 to generate speech signals prompting the participant (e.g., moderator) to upload the tone at a designated site. In step 415, conference bridge 113 generates speech signals prompting the participant (e.g., moderator) to upload the tone at a designated site.

If the participant (e.g., moderator) did not request to upload a tone, associated with the identified participant, for exiting the conference call, or, upon conference bridge 113 generating speech signals prompting the participant (e.g., moderator) to upload the tone, associated with the identified participant, at a designated site, controller 114, in step 401, waits to receive another request from the participant (e.g., moderator) to select a tone for the joining and/or exiting of a particular caller to a conference call.

Method 400 may include other and/or additional steps that, for clarity, are not depicted. Further, method 400 may be executed in a different order presented and that the order presented in the discussion of FIGS. 4A-B is illustrative. Additionally, certain steps in method 400 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for identifying which participant joined or exited a conference call, the method comprising:
   receiving a request from a requester to select a tone for joining and/or exiting a conference call for an identified participant;
   receiving a selection of a tone from a list of tones to be associated with said identified participant for joining and/or exiting said conference call; and
   saving, by a controller, said selected tone from said list of tones associated with said identified participant for joining and/or exiting said conference call.

2. The method as recited in claim 1 further comprising:
   receiving a modification to said selected tone for said identified participant; and
   modifying said selected tone for said identified participant.

3. The method as recited in claim 1 further comprising:
   receiving a request to block said selected tone for said identified participant; and
   discarding said selected tone associated with said identified participant.

4. The method as recited in claim 1 further comprising:
   receiving a revised tone for said selected tone associated with said identified participant for joining and/or exiting said conference call; and
   updating said selected tone associated with said identified participant with said revised tone.

5. A system, comprising:
   a memory unit for storing a computer program for identifying which participant joined or exited a conference call; and
   a processor coupled to said memory unit, wherein said processor, responsive to said computer program, comprises:
      circuitry for receiving a request from a requester to select a tone for joining and/or exiting a conference call for an identified participant;
      circuitry for receiving a selection of a tone from a list of tones to be associated with said identified participant for joining and/or exiting said conference call; and
      circuitry for saving said selected tone from said list of tones associated with said identified participant for joining and/or exiting said conference call.

6. The system as recited in claim 5, wherein said processor further comprises:
   circuitry for receiving a modification to said selected tone for said identified participant; and
   circuitry for modifying said selected tone for said identified participant.

7. The system as recited in claim 5, wherein said processor further comprises:
   circuitry for receiving a request to block said selected tone for said identified participant; and
   circuitry for discarding said selected tone associated with said identified participant.

8. The system as recited in claim 5, wherein said processor further comprises:
   circuitry for receiving a revised tone for said selected tone associated with said identified participant for joining and/or exiting said conference call; and
   circuitry for updating said selected tone associated with said identified participant with said revised tone.

9. A computer program product embodied in a non-transitory computer readable medium for identifying which participant joined or exited a conference call, the computer program product comprising the computer executable instructions for:
   receiving a request from a requester to select a tone for joining and/or exiting a conference call for an identified participant;
   receiving a selection of a tone from a list of tones to be associated with said identified participant for joining and/or exiting said conference call; and
   saving said selected tone from said list of tones associated with said identified participant for joining and/or exiting said conference call.

10. The computer program product as recited in claim 9 further comprising the computer executable instructions for:
    receiving a modification to said selected tone for said identified participant; and
    modifying said selected tone for said identified participant.

11. The computer program product as recited in claim 9 further comprising the computer executable instructions for:
    receiving a request to block said selected tone for said identified participant; and
    discarding said selected tone associated with said identified participant.

12. The computer program product as recited in claim 9 further comprising the computer executable instructions for:
    receiving a revised tone for said selected tone associated with said identified participant for joining and/or exiting said conference call; and
    updating said selected tone associated with said identified participant with said revised tone.

13. A method for identifying which participant joined or exited a conference call, the method comprising:
    receiving a request from a requester to access a conference call service;
    generating speech signals prompting said requester to indicate if said requester is to upload a tone for joining and/or exiting a conference call; and
    generating, by a conference bridge, speech signals prompting said requester to upload said tone at a designated site for joining and/or exiting said conference call if said requester indicated to upload said tone for joining and/or exiting said conference call, wherein said tone is associated with said requester.

14. The method as recited in claim 13 further comprising:
requesting authorization information from said requester to access said conference call service.

15. The method as recited in claim 13 further comprising:
receiving a modification to a designated tone for a designated participant; and
modifying said designated tone for said designated participant.

16. The method as recited in claim 13 further comprising:
receiving a request to block a designated tone for a designated participant; and
discarding said designated tone associated with said designated participant.

17. The method as recited in claim 13 further comprising:
receiving a revised tone for said uploaded tone for joining and/or exiting said conference call; and
updating said uploaded tone with said revised tone.

18. The method as recited in claim 13 further comprising:
receiving a request from a participant to record a live audio clip as a tone for joining and/or exiting said conference call;
recording said live audio clip; and
saving said recorded live audio clip for joining and/or exiting said conference call, wherein said recorded live audio clip is associated with said participant.

* * * * *